US010830568B2

(12) United States Patent
Karasawa et al.

(10) Patent No.: US 10,830,568 B2
(45) Date of Patent: Nov. 10, 2020

(54) MEASUREMENT DEVICE AND MEASUREMENT SYSTEM

(71) Applicant: MITUTOYO CORPORATION, Kanagawa (JP)

(72) Inventors: Yuuto Karasawa, Tochigi (JP); Mitsuru Fukuda, Tochigi (JP); Kazumi Mizukami, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 220 days.

(21) Appl. No.: 16/148,326

(22) Filed: Oct. 1, 2018

(65) Prior Publication Data

US 2019/0101370 A1    Apr. 4, 2019

(30) Foreign Application Priority Data

Oct. 4, 2017   (JP) .................................. 2017-194374

(51) Int. Cl.
  *G01B 5/008*   (2006.01)
  *G01B 21/04*   (2006.01)

(52) U.S. Cl.
  CPC .......... *G01B 5/008* (2013.01); *G01B 21/047* (2013.01)

(58) Field of Classification Search
  CPC .................................................... G01B 5/008
  USPC ......................................................... 33/503
  See application file for complete search history.

(56) References Cited

U.S. PATENT DOCUMENTS

| 8,516,712 B2 | 8/2013 | Kumagai et al. |
| 8,578,618 B2 | 11/2013 | Majima et al. |
| 2005/0283989 A1* | 12/2005 | Pettersson ............ G01B 21/045 33/502 |
| 2009/0299692 A1* | 12/2009 | Yoshizumi ............. G01B 5/008 702/168 |
| 2010/0101105 A1* | 4/2010 | Hon ...................... G01B 5/0014 33/503 |
| 2013/0185010 A1* | 7/2013 | Fukuda ................... G06F 15/00 702/95 |
| 2014/0059872 A1* | 3/2014 | Nakagawa ........... G01B 21/045 33/502 |
| 2014/0109419 A1* | 4/2014 | Shindo ................... G01B 5/201 33/502 |

(Continued)

FOREIGN PATENT DOCUMENTS

| JP | 2001-21303 A | 1/2001 |
| JP | 2012-78214 A | 4/2012 |

*Primary Examiner* — George B Bennett
(74) *Attorney, Agent, or Firm* — Greenblum & Bernstein, P.L.C.

(57) ABSTRACT

An object of the present invention is to provide a measurement device and a measurement system which make it possible to obtain various pieces of driving information and realize accurate analysis of an operation state.

A measurement device according to an embodiment comprises: a main body which comprises a probe having a gauge head which can be moved, in a relative manner, relative to an object to be measured, and a move mechanism for moving the gauge head; and a control section which controls driving of the move mechanism, and comprises a generation section for generating driving information of the main body, in association with identification information of the probe, in response to driving of the move mechanism, and a recording section for recording the driving information.

9 Claims, 9 Drawing Sheets

(56) References Cited

U.S. PATENT DOCUMENTS

| | | | |
|---|---|---|---|
| 2015/0052769 A1* | 2/2015 | Noda | G01B 21/047 |
| | | | 33/503 |
| 2016/0131470 A1* | 5/2016 | Ishikawa | G01B 21/045 |
| | | | 33/503 |
| 2016/0178362 A1* | 6/2016 | Iseli | G01B 3/008 |
| | | | 33/503 |
| 2017/0097220 A1* | 4/2017 | Oneta | G01B 5/008 |
| 2017/0341192 A1 | 11/2017 | Fukuda et al. | |
| 2018/0058847 A1 | 3/2018 | Nakagawa et al. | |
| 2018/0274913 A1 | 9/2018 | Kasahara | |

* cited by examiner

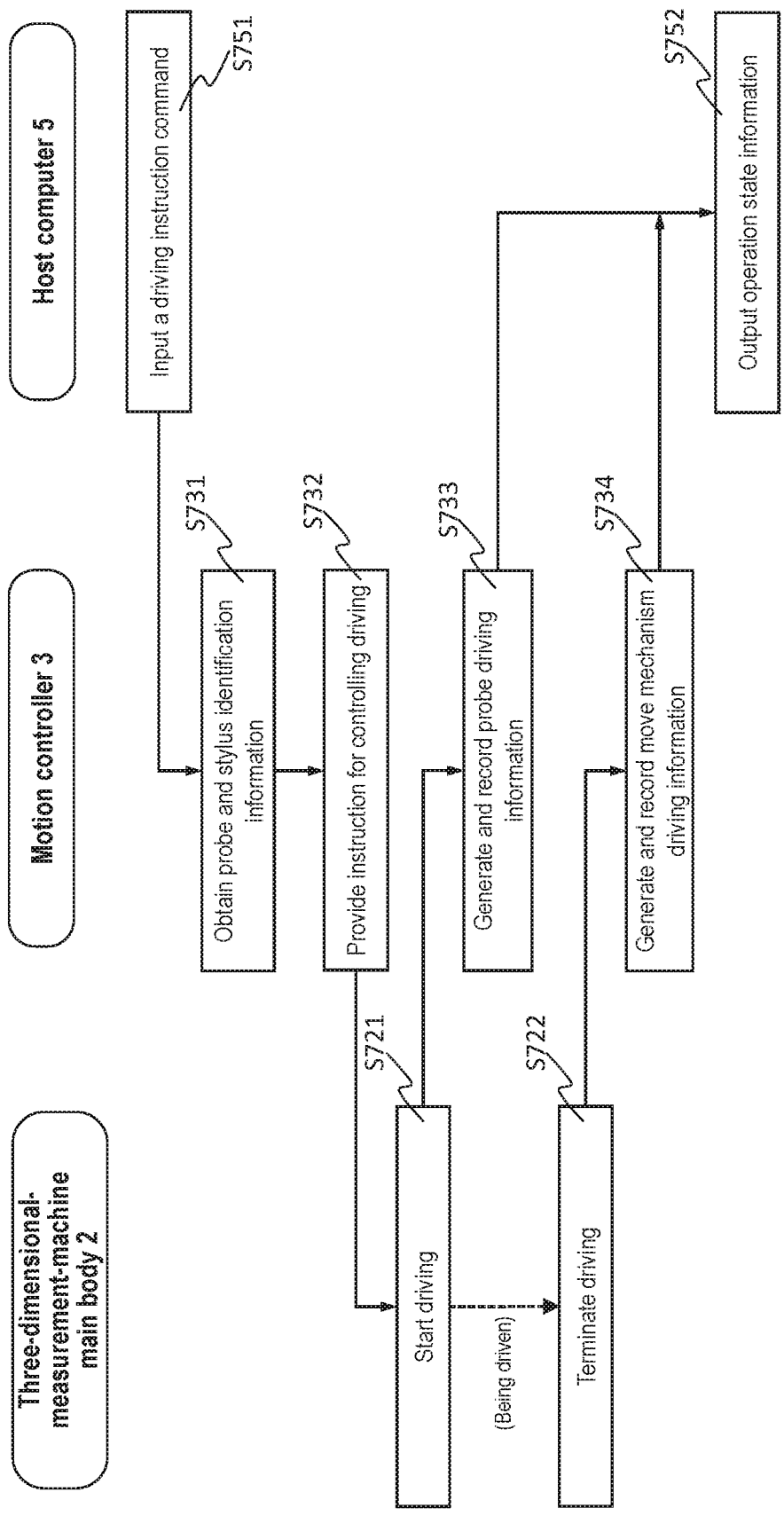

MEASUREMENT DEVICE AND MEASUREMENT SYSTEM

TECHNICAL FIELD

The present invention relates to a measurement device and a measurement system which perform measurement processing.

BACKGROUND ART

In prior art, a measurement device such as a three-dimensional measurement machine, in which a gauge head is moved along an axial direction (for example, X, Y, and Z directions) and an object to be measured is measured by use of the gauge head, has been known (for example, refer to Patent Literature 1). Usually, such a measurement device comprises a controller for controlling the measurement device, and experimental data is processed by a host computer connected to the controller. In the case that an error occurs during measurement operation, an error message is usually displayed on a display means such as a display or the like which is connected to the controller.

A measurement device which obtains and stores an error log together with time information, in addition to displaying an error message when an error has occurred, has also been known (for example, refer to Patent Literature 2). Regarding acquisition of an error log, such a measurement device may be constructed in such a manner that it uses measurement data for grasping a state of driving of the measurement device and forecasting a fault which may occur in the future.

CITATION LIST

Patent Literature

PTL 1: Japanese Patent Application Public Disclosure No. 2001-21303
PTL 2: Japanese Patent Application Public Disclosure No. 2012-78214

SUMMARY OF INVENTION

Technical Problem

In a measurement device such as that explained in PTL 1, usually, an error message is temporarily displayed on a display means, i.e., the error message is erased so that it is not displayed, after a predetermined period of time elapses. Thus, it takes time to investigate cause of a problem occurred in the past and solve the problem. Especially, in the case of a measurement device in which a frequency of occurrence of errors is low, a frequency of outputting of error messages is low; thus, there would be a risk that a user misses an error message if the user does not pay attention to a screen of a monitor.

On the other hand, in a measurement device such as that explained in PTL 2, data items obtainable as error logs are limited. Specifically, the measurement device merely records accumulated data relating to specific parts, such as driving time, driving distance, and so on of a move mechanism included in the measurement device. Further, since obtained and accumulated data are limited, forecast of a fault is limited, thus, the data are regarded, by a user, as mere supplementary data. Thus, the measurement device lacks flexibility in grasping of an operational state and/or forecasting of an accident of the measurement device.

In view of at least part of the above problems, the present invention relates to operation of a measurement device, and an object of the present invention is to provide a measurement device and a measurement system which make it possible to obtain a variety of driving information and realize accurate analysis of an operation state.

Solution to Problem

[Aspect 1] According to aspect 1, a measurement device is provided. The measurement device comprises: a main body which comprises a probe having a gauge head which can be moved, in a relative manner, relative to an object to be measured, and a move mechanism for moving the gauge head; and a control section which controls driving of the move mechanism, and comprises a generation section for generating driving information of the main body, in association with identification information of the probe, in response to driving of the move mechanism, and a recording section for recording the driving information.

According to the above construction, driving information relating to a probe can be obtained, and a variety of driving information can be generated. The variety of driving information can be used for detailed analysis of a driving state. Especially, driving information relating to a probe can be used for grasping a state of use of a presently attached probe, thus, can be used for appropriate analysis relating to a degree of consumption of the probe and timing to change the probe.

[Aspect 2] According to aspect 2, which comprises the measurement device of aspect 1, the control section may further comprise an input judgment section for judging probe input by the probe, based on contact of the gauge head to the object to be measured. Further, when it is judged that there is probe input, the generation section may increment an accumulated number of times of probe measurement included in the driving information.

In that case, information of the accumulated number of times of measurement by the probe, which is to be generated, can be used for analyzing a state of use of the probe, especially, a state of consumption of a probe module.

[Aspect 3] According to aspect 3, which comprises the measurement device of aspect 2, a stylus, which has the gauge head at its tip, in the probe is detachably attached to a probe main body. Further, the incremented accumulated number of times of probe measurement may additionally be associated with identification information of the stylus attached to the probe main body.

In that case, information of the accumulated number of times of measurement by the probe, which is to be generated, can be used for analyzing a state of use of the probe, especially, a consumption state of the stylus attached to the probe, in addition to that of the probe module.

[Aspect 4] According to aspect 4, which comprises the measurement device of one of aspects 1-3, the control section may further comprise a probe head instruction section which supplies, to the probe head, a rotation instruction for rotating the probe head by a predetermined angle. Further, when the rotation instruction is supplied by the probe head instruction section, the generation section may increment an accumulated number of times of probe head operation and record it in the recording section.

In that case, information of a generated accumulated number of times of operation of the probe head can be used for analyzing a state of consumption of the probe head.

[Aspect 5] According to aspect 5, which comprises the measurement device of one of aspects 1-4, the control section may further comprise a probe type judgment section for judging whether the probe is a type of a scanning probe for scanning measurement, and a scanning distance calculation section for calculating a scanning distance, based on each of coordinate positions of the gauge head at predetermined sampling time, in the case that the probe is a type of a scanning probe. Further, when the scanning distance is calculated, the generation section may add the scanning distance to an accumulated scanning distance and record it in the recording section.

In that case, information of the accumulated scanning distance, which is to be generated, can be used for analyzing a state of use of the scanning probe, especially, a state of consumption of a scanning probe module and a state of consumption of a stylus attached to the scanning probe.

[Aspect 6] According to aspect 6, which comprises the measurement device of one of aspects 1-5, the control section may further comprise an input judgment section for judging probe input in the probe, based on contact of the gauge head to the object to be measured, and a mode judgment section for judging whether the probe is operated under a predetermined mode. Further, when it is judged that there is probe input and the mode is judged to be the predetermined mode, the generation section may further increment an accumulated number of times of collision and record it in the recording section.

In that case, information of the accumulated number of times of collision, which is to be generated, can be used for analyzing a state of consumption of the main body due to collision with the object to be measured.

[Aspect 7] According to aspect 7, which comprises the measurement device of one of aspects 1-6, the control section may further comprise an electric-conduction time calculation section for calculating electric-conduction time of the main body, from application to disconnection of an electric power source, based on the time specified by a clock. Further, when the electric-conduction time is calculated, the generation section may further add the electric-conduction time to accumulated electric-conduction time information and record it in the recording section.

In that case, accumulated electric-conduction time, which is to be generated, can be used for analyzing the rate of operation of the main body.

[Aspect 8] According to aspect 8, a measurement system is provided. The measurement system comprises: a main-body device which comprises a probe having a gauge head which can be moved, in a relative manner, relative to an object to be measured, and a move mechanism for moving the probe; a control computer which is connected to the main-body device and drives the move mechanism; and a host computer which is connected to the control computer and records lifetime information of the main-body device. Further, the control computer is constructed in such a manner that it generates driving information of the main-body device in response to driving of the move mechanism, and stores the driving information. The host computer is also constructed in such a manner that, when it receives driving information from the control computer, it generates operation state information of the main-body device based on the lifetime information and the driving information, and outputs the operation state information. Further, the lifetime information and the driving information is associated with identification information of the probe.

According to the above construction, driving information relating to a probe can be obtained, and a variety of driving information can be generated. The variety of driving information can be used for detailed analysis of a driving state. Especially, driving information relating to a probe can be used for grasping a state of use of a presently attached probe, thus, can be used for appropriate analysis relating to a degree of consumption of the probe and timing to change the probe.

In addition, according to the above construction, a user can grasp operation state information relating to the probe. Further, it makes possible to perform effective preventive maintenance, according to calculation of precise maintenance time. It also makes possible to prompt, at appropriate timing, a user to perform maintenance, and facilitate processing such as that for investigating cause of an operational failure when it actually has occurred in the measurement system. Further, according to the above construction, a user can refer to the lifetime information by use of the host computer, and change it freely. A user can independently change the lifetime information based on an actual state of use, thus, flexible action in terms of preventive maintenance can be realized.

[Aspect 9] According to aspect 9, which comprises the measurement system of aspect 8, it is constructed that identification information of the probe is received from the host computer when the control computer drives the move mechanism, and the identification information may be associated with the driving information.

In that case, driving information of each probe can be generated in the control computer, in cooperation with the host computer.

BRIEF DESCRIPTION OF DRAWINGS

FIG. 7 is a flowchart of entire processing in the three-dimensional measurement machine.

DESCRIPTION OF EMBODIMENTS

In the following description, a measurement device and a measuring system according to embodiments will be explained with reference to figures. The present invention is not that limited to examples of such embodiments and that shown in the claims, and it is intended that the present invention covers all modifications which are equivalent in meaning of the claims and within the scope of the claims. In the following description, the same reference symbols are assigned to the same components in explanation of the figures, and duplication of explanations will be omitted.

[Schematic Construction of Three-Dimensional Measurement Machine 1]

Figure 1:
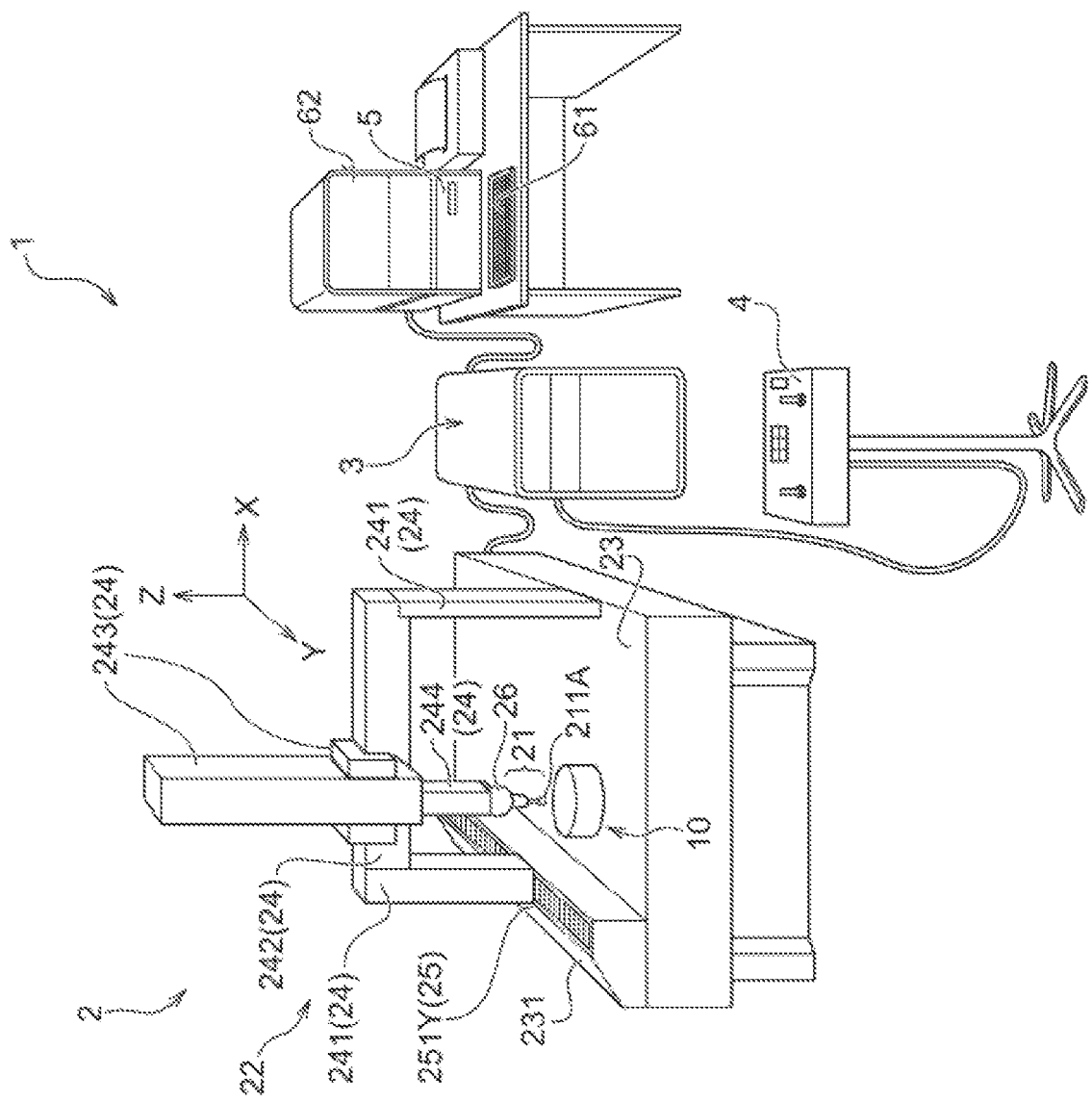
FIG. 1 is a schematic drawing of a construction of a three-dimensional measurement machine.

FIG. 1 relates to a measurement device and a measuring system according to an embodiment, and is a figure showing a schematic construction of a three-dimensional measurement machine 1 which is industrial equipment. In FIG. 1, the three-dimensional measurement machine 1 comprises a three-dimensional-measurement-machine main body 2, a motion controller 3, a manipulation means 4, and a host computer 5. The three-dimensional measurement machine 1 is also referred to, in a simple manner, as a measurement device. The three-dimensional-measurement-machine main body 2 is also referred to, in a simple manner, as a main-body device or a main body, and performs operation for measuring an object 10 to be measured. The motion controller 3 is also referred to as a control device or a control computer, and performs control of driving of the three-dimensional-measurement-machine main body 2. The manipulation means 4 is that for giving an instruction to the motion controller 3 via a manipulation lever, and manually manipulating the three-dimensional-measurement-machine main body 2. The host computer 5 also gives an instruction to the motion controller 3 and manipulates the three-dimensional-measurement-machine main body 2. A variety of arithmetic processing is performed relating to measurement information or operation information received via the motion controller 3. Note that the manipulation means 4 and the host computer 5 are connected to the motion controller 3 via cables.

[Construction of Three-Dimensional-Measurement-Machine Main Body 2]

Figure 2:
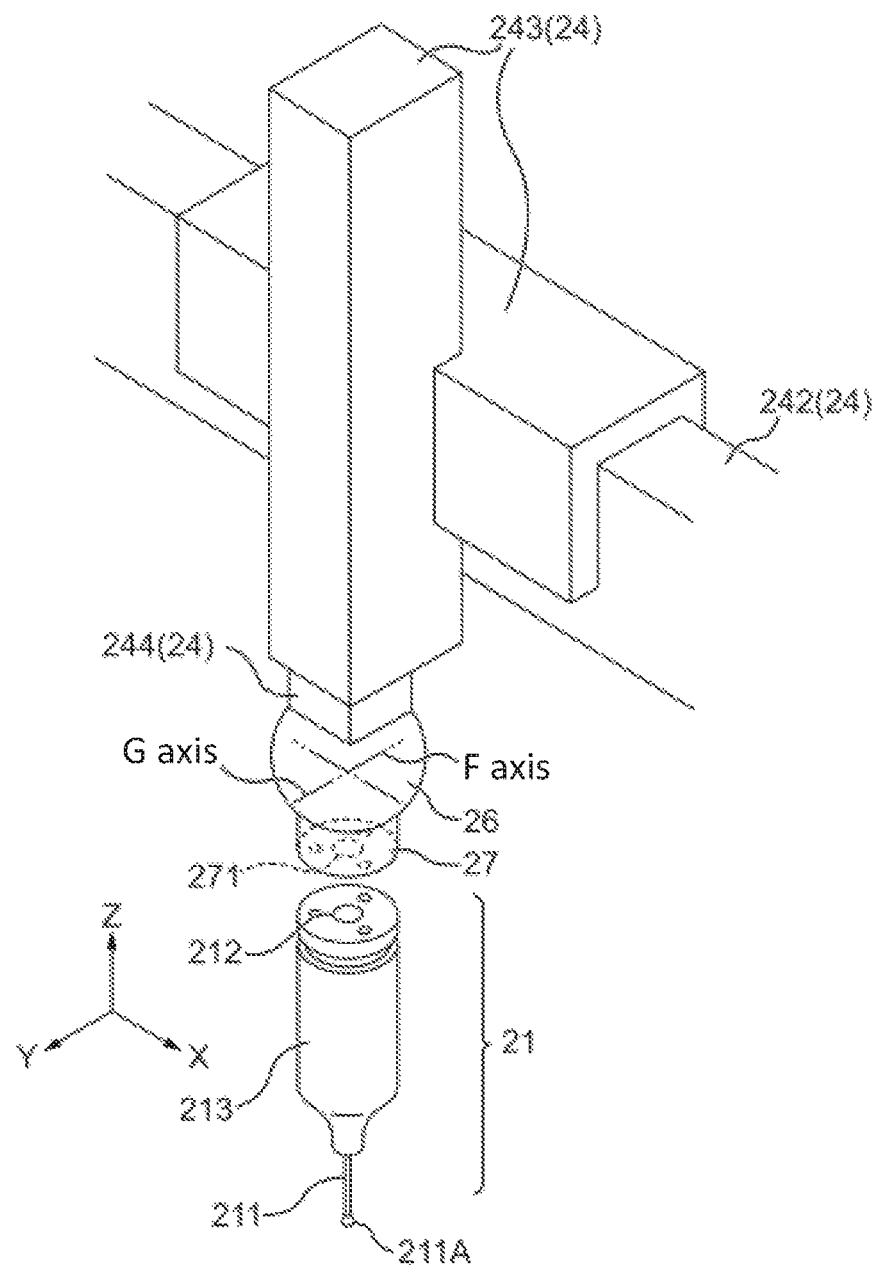
FIG. 2 is a schematic drawing of a construction of a probe attached to a move mechanism.
Figure 3:
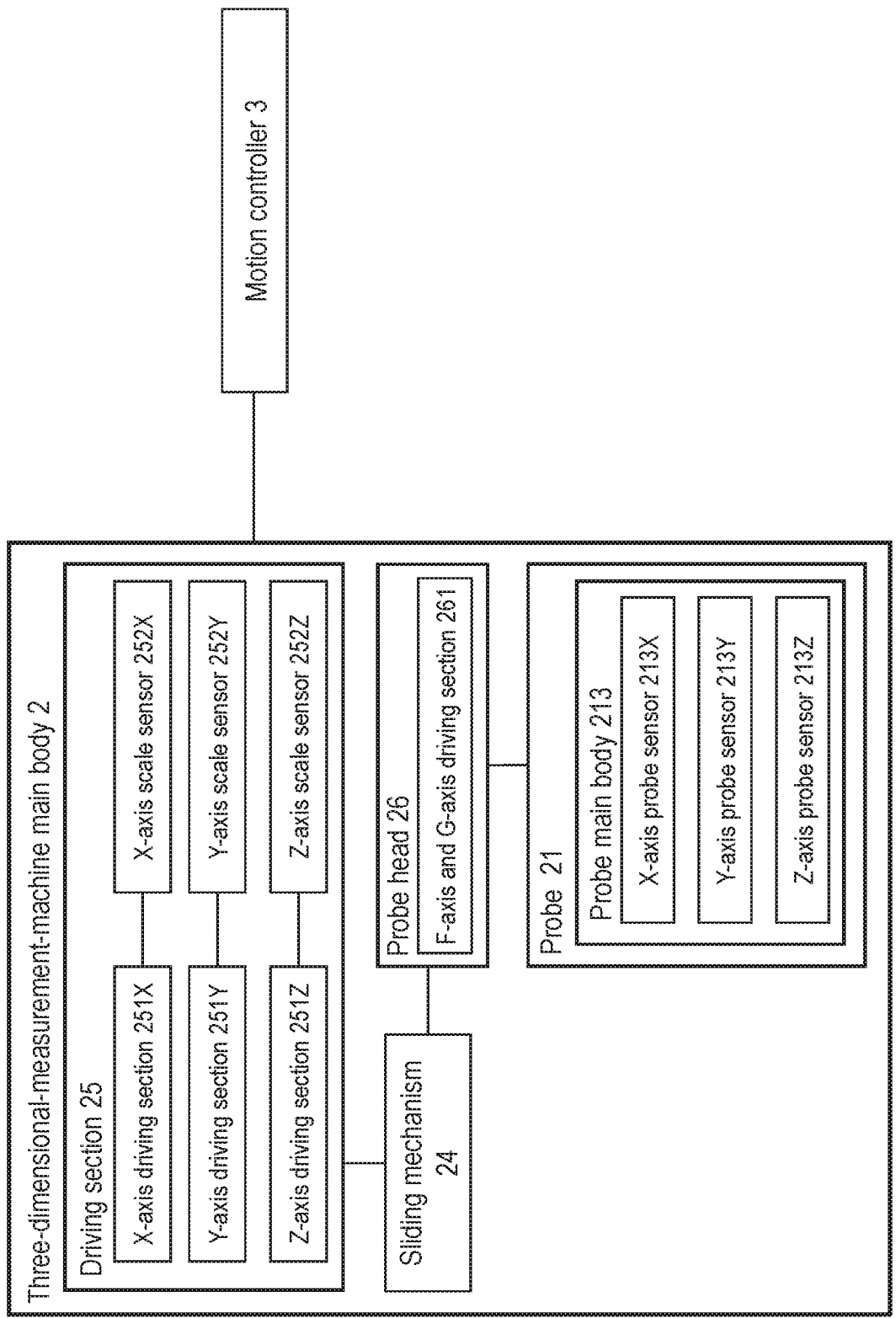
FIG. 3 is a drawing of function blocks implemented in a main body of the three-dimensional measurement machine.

Schematic constructions of the three-dimensional-measurement-machine main body 2 included in the three-dimensional measurement machine 1 are shown in FIGS. 1-3.

FIG. 1 shows an overall construction of the three-dimensional-measurement-machine main body 2, and FIG. 2 shows a schematic construction of a probe 21 attached to a move mechanism 22 of the three-dimensional-measurement-machine main body 2. FIG. 3 is a drawing of function blocks implemented in the measurement-device main body 2. Note that, in FIGS. 1 and 2, a vertical upward direction is defined to be +Z axis direction, and two axes orthogonal to the Z axis are defined to be an X axis and a Y axis, respectively.

As shown in FIG. 1, the three-dimensional-measurement-machine main body 2 comprises a probe 21 having a gauge head 211A for measuring the object 10 to be measured, a move mechanism 22 for moving the probe 21, and a base 23 on which the move mechanism 22 is installed in a standing manner. As shown in FIG. 2, the probe 21 is detachably attached to the move mechanism 22. The move mechanism 22 comprises a sliding mechanism 24 which holds a base-end side (the side of the +Z axis direction) of the probe 21 and allows the probe 21 to move in a sliding manner, and a driving mechanism 25 for moving the probe 21 by driving the sliding mechanism 24.

The sliding mechanism 24 comprises two columns 241, a beam 242, a slider 243, and a ram 244. The two columns 241 are installed in such a manner that they extend from both ends in the X axis direction on the base 23 toward the +Z axis direction, respectively, and that they can move in a sliding manner in the Y axis direction. The beam 242 is supported by each of the columns 241, and extends in the X axis direction. The slider 243 is installed in such a manner that it can move in a sliding manner in the X axis direction on the beam 242. The ram 244 is installed in such a manner that it is inserted in the slider 243, and can move in a sliding manner in the Z axis direction in the slider 243. Also, the ram 244 holds a base-end side of the probe 21 at an end part at the −Z axis direction side. In this manner, the move mechanism 22 is constructed to have plural axes for moving the probe 21 in X, Y, and Z axis directions.

As shown in FIG. 3, the driving mechanism 25 comprises X-axis, Y-axis, and Z-axis driving sections 251X, 251Y, and 251Z. These driving sections comprise driving motors and drive transmitting mechanisms for transmitting driving force supplied from the driving motors to the sliding mechanism 24. The columns 241, the slider 243, and the ram 244 are moved in sliding manners by the driving force of the driving motors. Specifically, the X-axis driving section 251X drives the slider 243 on the beam 242 in the X axis direction. The Y-axis driving section 251Y drives one of columns 241, which is positioned at the −X axis direction side, in the Y axis direction. The Z-axis driving section 251Z drives the ram 244 in the slider 243 in the Z axis direction.

The X-axis, Y-axis, and Z-axis driving sections 251X, 251Y, and 251Z are provided with X-axis, Y-axis, and Z-axis scale sensors 252X, 252Y, and 252Z for detecting positions of the slider 243, the respective columns 241, and the ram 244 in the respective axis directions. The respective scale sensors 252X-Z are position sensors which output pulse signals corresponding to the amounts of movement of the slider 243, the respective columns 241, and the ram 244.

As explained above, the probe 21 is attached to the move mechanism 22 of the three-dimensional-measurement-machine main body 2. Specifically, as shown in FIG. 2, a joint-type probe head 26 is attached to a bottom end of the ram 244 of the sliding mechanism 24, and the probe head 26 is provided with a probe holding member 27. The probe head 26 is provided with a F-axis and G-axis driving section 261 for rotationally moves the probe holding member 27 relating to a plane consisting of an F axis and a G axis which are orthogonal to each other and on the plane parallel to an XY plane. A permanent magnet 271 is put on the center of the end surface of the probe holding member 27.

The probe 21 has a permanent magnet 212, which is put on the center of the base-end surface, to be attracted to the permanent magnet 271 of the probe holding member 27. Also, grooves, which are equally spaced apart from each other, are formed to be engaged with corresponding parts of the probe holding member 27. The probe 21 comprises a stylus 211 having, at its tip side, a gauge head 211A, and a probe main body 213 which supports a base-end side of the stylus 211. The stylus 211 is detachably attached to the probe main body 213.

The probe main body 213 supports the stylus 211 in such a manner that the stylus 211 is positioned at a predetermined position by biasing it in each of X-axis, Y-axis, and Z-axis directions. The probe main body 213 allows the stylus 211 to be moved within predetermined ranges in X-axis, Y-axis, and Z-axis directions, when external force is applied to the gauge head 211A, i.e., when the gauge head 211A contacts to the object 10 to be measured. Further, the probe main body 213 comprises an X-axis probe sensor 213X, a Y-axis probe sensor 213Y, and a Z-axis probe sensor 213Z (FIG. 3) for detecting positions, in the respective axis directions, of the stylus 211. Similar to the scale sensors 252X-Z, the probe sensors 213X-Z are position sensors which output pulse signals corresponding to the amounts of movement of the stylus 211 in the respective axis directions.

The probe 21 is exchangeable. That is, a stocker, which houses predetermined plural types of probes, is constructed in a standing manner on the base 23 (for example, at a side of the −Y axis direction/not shown in the figure), and a probe 21 is selected from the plural probes housed in the stocker and detachably held by the probe holding member 27. In the following, each of two types of probes, specifically, a "touch probe" for performing touch measurement and a "scanning probe" for performing scanning measurement, is assumed to be the probe 21.

[Construction of Motion Controller 3]

Figure 4:
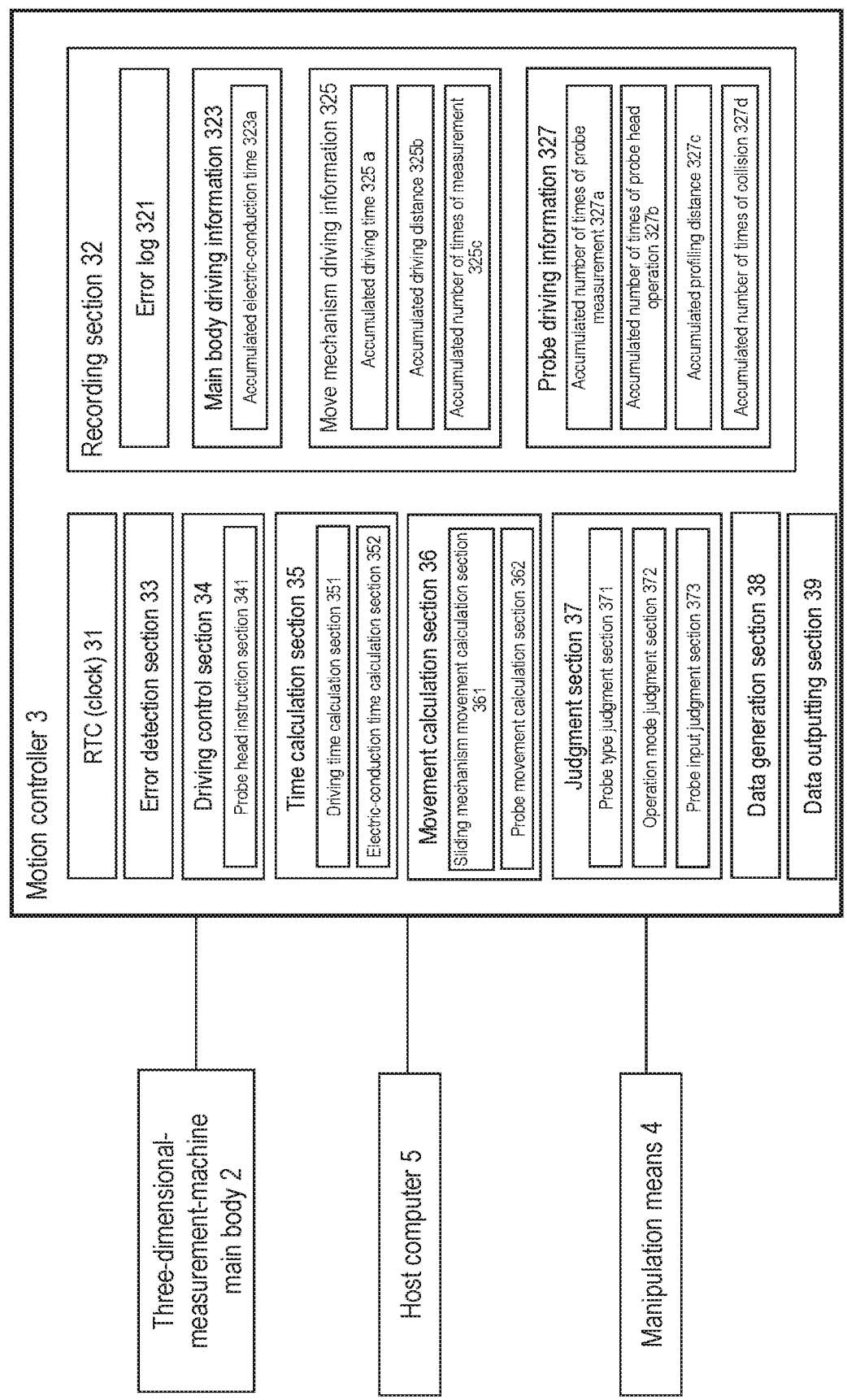
FIG. 4 is a drawing of function blocks implemented in a motion controller.

Schematic constructions of the motion controller 3 included in the three-dimensional measurement machine 1 are shown in FIGS. 1 and 4.

FIG. 4 is a drawing of function blocks implemented in the motion controller 3. The motion controller 3 comprises a CPU (Central Processing Unit), a memory device, and so on, and is constructed as a control section for controlling driving of the move mechanism 22. The motion controller 3 comprises an RTC (Real Time Clock) 31, a recording section 32, an error detection section 33, a driving control section 34, a time calculation section 35, a movement calculation section 36, a judgment section 37, a data generation section 38, and a data outputting section 39.

The RTC 31 is also referred to as a clock, and constructed by use of a chip for measuring a time. The RTC 31 can work by using electric power supplied from an internal battery (not shown in the figure) under a state that an electric power source has not been applied, and always specify the time.

Regarding the recording section 32, a recording medium such as an EEPROM (Electrically Erasable PROM), a flash memory, or the like, which can store various types of data, is used as it. The recording section 32 stores various pieces of driving information obtained in relation to driving operation of the three-dimensional-measurement-machine main body 2. Specifically, an error log 321 generated in the three-dimensional-measurement-machine main body 2, main body driving information 323 relating to driving of the three-dimensional-measurement-machine main body 2, move mechanism driving information 325 relating to driving of the move mechanism 22, and probe driving information 327 relating to driving of the probe 21 is recorded. In addition to the above, measurement data obtained from the three-dimensional-measurement-machine main body 2 are recorded.

The main body driving information 323 includes accumulated electric-conduction time 323a of the three-dimensional-measurement-machine main body 2. The move mechanism driving information 325 includes accumulated driving time 325a of each part of the columns 241, the slider 243, and the ram 244 of the sliding mechanism 24, an accumulated driving distance 325b of each part, and an accumulated number of times of measurement 325c according to driving of the move mechanism 22. The probe driving information 327 includes an accumulated number of times of probe measurement 327a of each probe, an accumulated number of times of probe head operation 327b, an accumulated scanning distance 327c of each scanning probe, and an accumulated number of times of collision 327d of a probe with respect to the object 10 to be measured.

The error detection section 33 monitors the state of the three-dimensional-measurement-machine main body 2, detects operation failure (an error) that has occurred, and specifies the time that the error has occurred by use of the RTC31. The error detection section 33 records an error log 321 in the recording section 32 every time when an error has occurred, wherein he error log 321 associates error information including an error code which has been preset for representing a type of a detected error and coordinates of the position of the gauge head 211, in relation to which the error has occurred, with the time of occurrence of the error.

The driving control section 34 receives a driving instruction signal which is inputted when the manipulation means 4 is manipulated, and a driving instruction signal which is inputted from the host computer 5, and, in response thereto, controls the driving mechanism 25 of the move mechanism 22 to drive it. When driving the driving mechanism 25 in response to reception of a driving instruction signal from the host computer 5, it is preferable to receive identification information of the probe 21. The received identification information would later be associated, as the probe driving information 327, with various pieces of driving information. Further, it may be preferable that the driving control section 34 include a probe head instruction section 341 which supplies a rotational driving instruction to the probe head 26.

The time calculation section 35 calculates operation time, based on the time of operation specified by monitoring the RTC (i.e., a clock). The time calculation section 35 includes a driving time calculation section 351 and an electric-conduction time calculation section 352. The driving time calculation section 351 calculates driving time of each part, by adding an amount of time of each predetermined time interval in a period between a start of driving of the drive mechanism 25 and an end thereof. Also, the electric-conduction time calculation section 352 calculates electric-conduction time of the three-dimensional-measurement-machine main body 2, by adding an amount of time of each predetermined time interval in a period between application of an electric power source to the three-dimensional-measurement-machine main body 2 and disconnection of the electric power source therefrom.

The movement calculation section 36 calculates the amount of movement, based on pulse signals outputted from various sensors of the three-dimensional-measurement-machine main body 2. The movement calculation section 36 includes a sliding mechanism movement calculation section 361 and a probe movement calculation section 362. The sliding mechanism movement calculation section 361 calculates the amount of movement of the sliding mechanism 24 by specifying position coordinates based on pulse signals outputted from the respective scale sensors 252X-Z. Also, the probe movement calculation section 362 calculates the amount of movement of the probe 21 by detecting pulse signals outputted from the respective probe sensors 213X-Z. Especially, it may comprise, in the case that the probe 12 is a type of a "scanning probe," a scanning distance calculation section (not shown in the figure) which obtains position coordinates of the gauge head 211A positioned at the tip of the probe 21 at each predetermined sampling time, and calculates, based thereon, a scanning distance.

The judgment section 37 performs judgment processing with respect to various states of the three-dimensional-measurement-machine main body 2. The judgment section 37 comprises a probe type judgment section 371, an operation mode judgment section 372, and a probe input judgment section 373.

The probe type judgment section 371 judges whether the type of the probe 21 detachably attached to the move mechanism 22 is a "scanning probe" or a "touch probe." This judgement can be realized by analyzing pulse signals outputted from various sensors of the three-dimensional-measurement-machine main body 2.

The operation mode judgment section 372 judges whether the move mechanism 22 is moved under a "measurement mode" or operated under a "move mode" (a non-measurement mode). The "measurement mode" is an operation mode for measuring, by the probe 21, the object 10 to be measured. On the other hand, the "move mode" is an operation mode, which is a non-measurement mode, for moving the probe 21 without measuring, by the probe 21, the object 10 to be measured.

It is preferable that the probe input judgment section 373 judge whether probe input in the probe 21 exists or not, based on reception of a signal responding to contact of the gauge head 211A to the object 10 to be measured. In this embodiment, the method for judging the probe input is different, according to whether the type of the probe 21 is the "scanning probe" or the "touch probe." Specifically, in the case of the "touch probe," a controller for the touch probe (not shown in the figure) detects a pulse signal which is output responding to contact (a touch ON signal) and judges that there is probe input. On the other hand, in the case of the "scanning probe," it is judged whether a contact state is continued for a predetermined distance. That is, based on an event that the amount of movement of the probe 21 calculated by a scanning distance calculation section (the probe movement calculation section 362) exceeds a predetermined threshold, it is judged that there is probe input.

The data generation section 38 generates various pieces of driving information of the three-dimensional-measurement-machine main body 2 in cooperation with the above described respective function blocks 31-37. Especially, accumulated driving information is generated and updated by adding obtained values to various pieces of driving information recorded in the recording section 32. For example, driving information of the three-dimensional-measurement-machine main body 2 is updated in response to driving of the move mechanism 22. At that time, the probe driving information 327 associates identification information of the probe, which is received from the host computer 5, with driving information. The data outputting section 39 reads various data recorded in the recording section 32, and outputs them at predetermined timing to the host computer 5.

[Construction of Host Computer 5]

Figure 5:
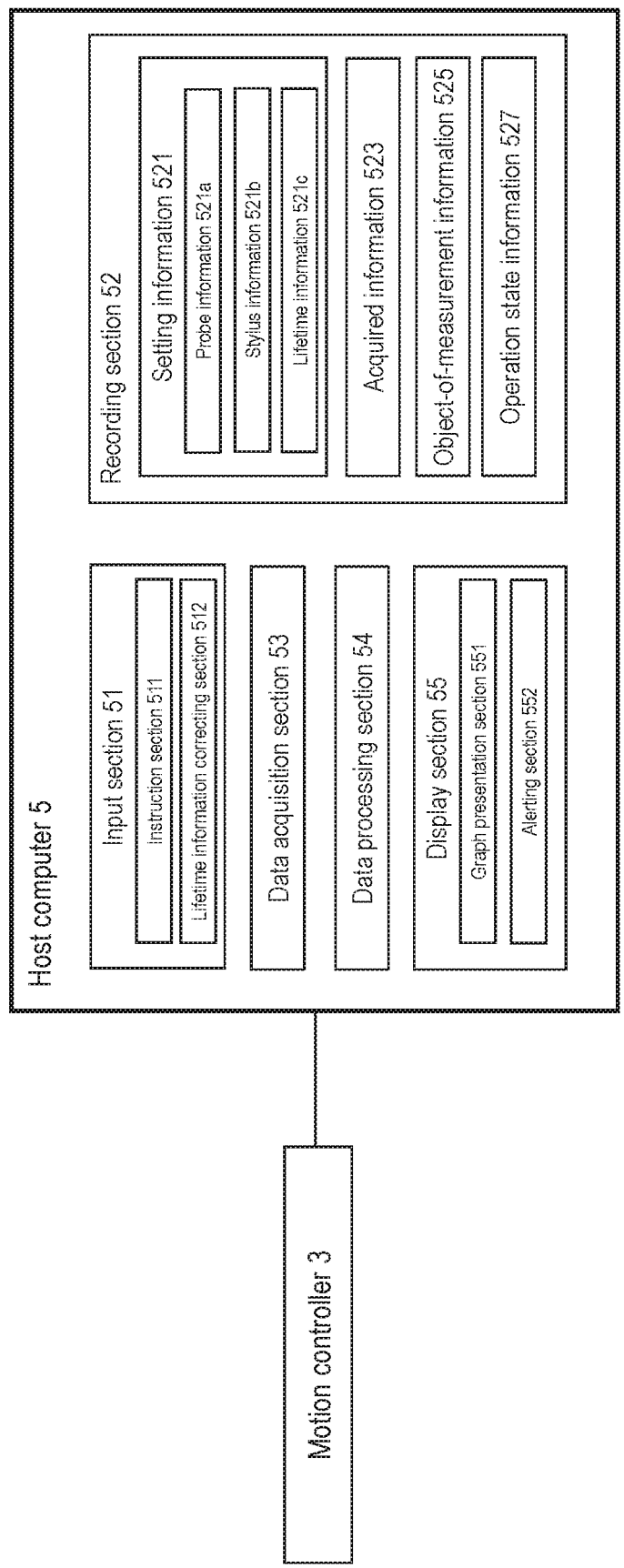
FIG. 5 is a drawing of function blocks implemented in a host computer.

FIGS. 1 and 5 show schematic constructions of the host computer 5 included in the three-dimensional measurement machine 1. FIG. 5 is a drawing of function blocks implemented in the host computer 5. The host computer 5 is an information processing device used for performing arithmetical processing of data via applications, and is realized by using a multipurpose computer such as a workstation, a personal computer, a tablet terminal, or the like, for example. In the host computer 5, a CPU executes applications implemented by computer programs stored in a storage device to perform various functions. It is preferable that the motion controller 3 and the host computer 5 be connected to each other by cable connection by using a USB (Universal Serial Bus), for example.

The host computer 5 comprises an input section 51 for receiving an input from an input means 61, a recording section 52, a data acquisition section 53 for receiving various pieces of information from the motion controller 3, a data processing section 54 for processing received various pieces of information, and a display section 55 for displaying result of processing.

The input section 51 comprises an instruction section 511 and a lifetime information correcting section 512. The instruction section 511 receives an input, by the input means 61, of a measurement condition at the three-dimensional-measurement-machine main body 2 and a driving instruction, and supplies it to the motion controller 3. The lifetime information correcting section 512 receives a change, by the input means 61, of lifetime information 521c of the three-dimensional-measurement-machine main body 2 recorded in the recording section 52.

A recording medium, which can record various data, is used in the recording section 52. Specifically, it is realized in such a manner that a main storage comprising a volatile storage device such as a DRAM (Dynamic Random Access Memory) or the like, and a supplementary storage comprising a non-volatile storage device such as a flash memory, an HDD (Hard Disk Drive) or the like are included. The data recorded in the recording section 52 comprises various pieces of setting information 521 which is used when driving the driving mechanism 25, various pieces of acquired information 523 from the motion controller 5, object-of-measurement information 525 which is result of processing for shape analysis and so on of the object 10 to be measured, and operation state information 527 of an operation state.

Also, the setting information 521 comprises probe information 521a relating to the probe 21, stylus information 521b relating to the stylus 211, and lifetime information 521c of the three-dimensional-measurement-machine main body 2. The probe information 521a is information relating to plural probes housed in the stocker. It comprises identification information for uniquely identify the probe 21, probe numbers which are position information in the stocker, probe types, identification information of the stylus 211 which is presently attached to the probe 21. It is preferable that relationship between the probe numbers, the probe identification information, and the stylus identification information be recorded, for example, as records in the form of a table in a database. The stylus information 521b is information relating to plural styluses 211 which can be attached to respective probes 21, and comprises identification information for uniquely identify the stylus 211, stylus types, length of the stylus 211, and shape information such as a chip diameter and so on of the gauge head 211A at the tip. The lifetime information 521c includes operation guaranteeing data corresponding to respective data items of driving information including the main body driving information 323, the move mechanism driving information 325, and the probe driving information 327 recorded in the recording section 33 of the motion controller 3.

The data acquisition section 53 receives various pieces of information including driving information and measurement information stored in the recording section 32 of the motion controller 3. The data processing section 54 performs, based on measurement information received by the data acquisition section 53, arithmetic processing for shape analysis and so on of the object 10 to be measured, and generates result of measurement by the three-dimensional measurement machine 1. The data processing section 54 also generates operation state information 527 representing an operation state and, in a certain case, issues an alarm. It is preferable that, as the alarm, a corresponding alarm message be displayed.

The display section 55 displays, on the display means 62, result of processing by the data processing section 54. The display section 55 comprises a graph presentation section 551 and an alerting section 552. The graph presentation section 551 displays a graph representing the operation state information 527 showing an operation state, based on the lifetime information 521c and the driving information, and the alerting section 552 displays a corresponding alarm message.

The respective function blocks shown in FIGS. 3-5 are mere examples, and a person skilled in the art would understand that function blocks are not limited thereto. Especially, all or part of the function blocks of the motion controller 3 shown in FIG. 4 may be incorporated, as function blocks, into the three-dimensional-measurement-machine main body 2 shown in FIG. 3. Further, part of the host computer 5 shown in FIG. 5 may be incorporated, as function blocks, into the motion controller 3 shown in FIG. 4. In addition, the above-stated examples of various pieces of information are not limited to the data items, the data structures, and recording locations shown in the figures.

[Information Processing in Three-Dimensional Measurement Machine 1]

Figure 6:
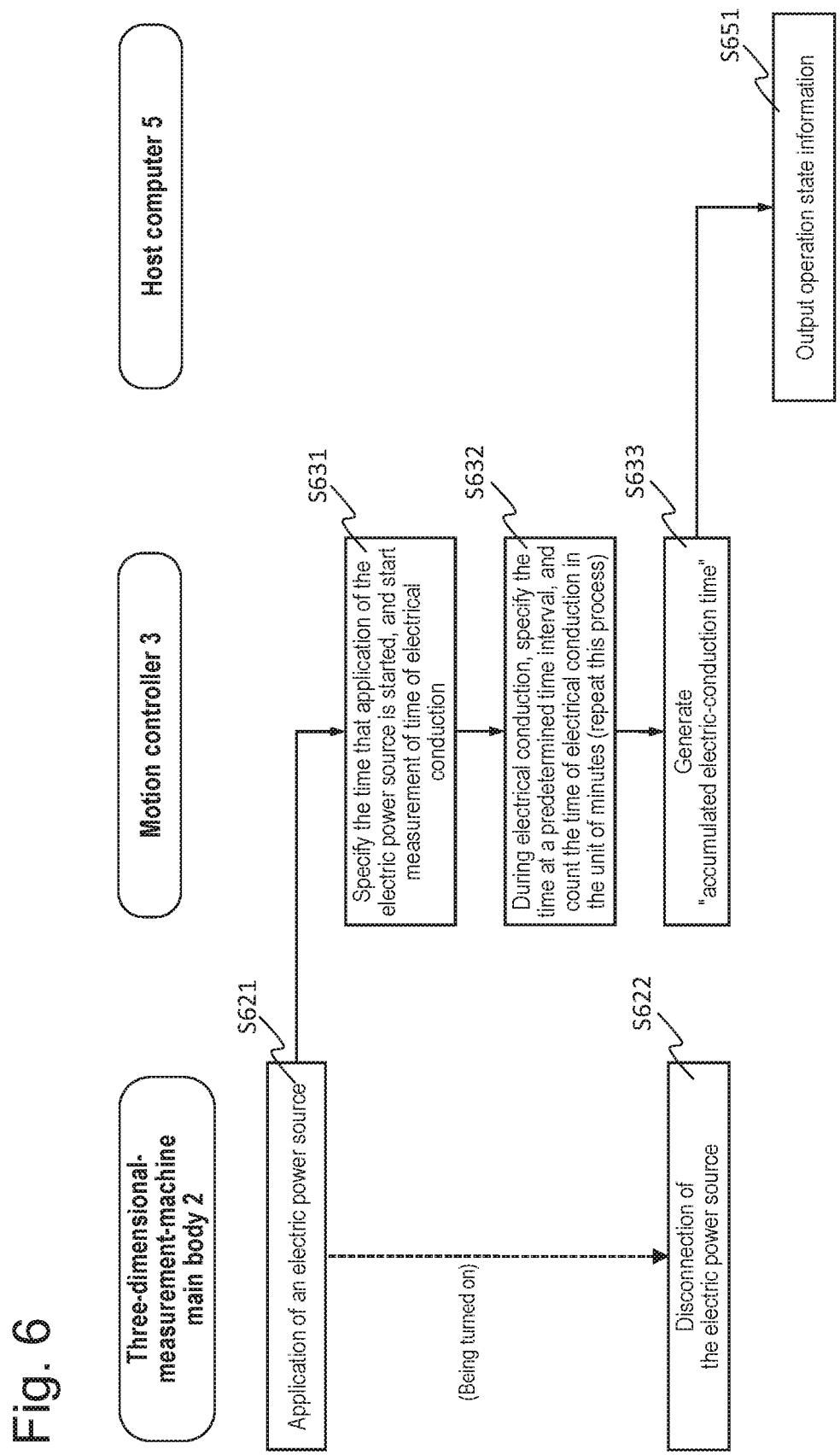
FIG. 6 is a flowchart of entire processing in the three-dimensional measurement machine.
Figure 10:
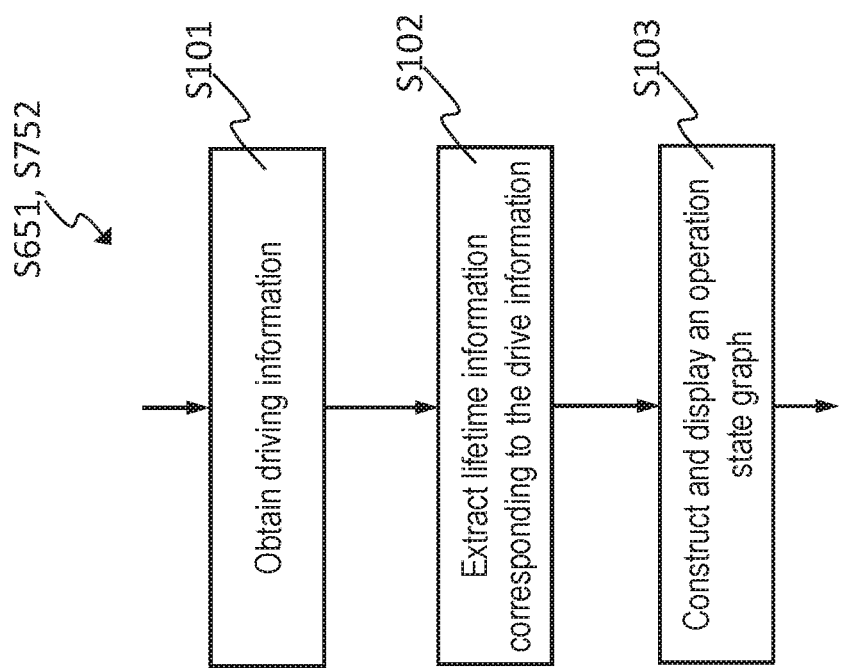
FIG. 10 is a flowchart of processing in the host computer.

In the following description, various types of processing operation in the above-stated three-dimensional measurement machine 1 will be explained with reference to FIGS. 6-10. FIG. 6 shows a flowchart of entire processing, in the three-dimensional measurement machine 1, relating to generation of the main body driving information 323, and FIG. 7 shows a flowchart of entire processing, in the three-dimensional measurement machine 1, relating to generation of the move mechanism driving information 325 and the probe driving information 327. FIGS. 8(*a*)-8(*c*) show flowcharts of processing for generating example data items in the probe driving information 327, and FIG. 9 shows a flowchart of processing for generating example data items in the move mechanism driving information 325. Finally, FIG. 10 shows a flowchart of processing for generating, in the host computer 5, operation state information of the three-dimensional-measurement-machine main body 2. Note that the order of processing in the respective blocks is not limited to that shown in the figures, and the processing may be performed in a different order. For example, plural blocks shown in a continuous manner may be performed in a parallel manner (a concurrent manner). Alternatively, execution in a reversed order may be possible, depending on functions relating thereto.

In the processing flow of FIG. 6, the "accumulated electric-conduction time" 323*a* of the main body driving information 323 is generated and recorded. First, when manipulation by a user for starting application of an electric power source is received in the three-dimensional-measurement-machine main body 2 (S621), the RTC 31 in the motion controller 3 specifies the time that application of the electric power source is started, and starts measurement of electric-conduction time (S631). Thereafter, the three-dimensional-measurement-machine main body 2 keeps an electric-conduction state until the electric power source is disconnected (S622). During the electric-conduction state, the motion controller 3 specifies, in a continuous manner, the time at timing of predetermined time intervals (for example, every 0.1 second) by the RTC 31, and the electric-conduction time calculation section 352 adds (for example, counts in the unit of minutes), in a repeating manner, the electric-conduction time at timing of predetermined time intervals (S632). In this manner, the electric-conduction time of the three-dimensional-measurement-machine main body 2 is calculated. The electric-conduction time is recorded at timing of a predetermined time (for example, every 0th and 30th minutes of every hour, such as 12 p.m., 12:30 p.m., . . . ) specified by the RTC 31. The recorded electric-conduction time is added, by the data generation section 38, to the accumulated electric-conduction time 323*a*. That is, the accumulated electric-conduction time 323*a* is updated and recorded in the recording section 32 (S633). The recorded accumulated electric-conduction time 323*a* is supplied to the host computer 5, and outputted, by the display section 55, as part of information representing the state of driving (S651/FIG. 10).

In the processing flow of FIG. 7, the move mechanism driving information 325 and the probe driving information 327 is generated and recorded, in relation to driving of the three-dimensional-measurement-machine main body 2. First, a driving instruction command is inputted to the motion controller 3 by manipulation, by a user, of the host computer 5 and/or the manipulation means 4 (S751). In response to the input, the instruction section 511 of the host computer 5 supplies a driving instruction to the motion controller 3. The supplied driving instruction may include, for example, designation of the operation mode, information of whether rotation is required and angles of rotation of the probe head 26, and identification information of the probe 21 and the stylus 211 presently attached to the sliding mechanism 24.

The motion controller 3, which received the driving instruction, extracts identification information of the probe 21 and the stylus 211 and records it in the recording section 32 (S721). In the case that the driving instruction includes an instruction for rotating the probe head, it is preferable to record this matter in the recording section 32. Also, in the case that the driving instruction includes information of the driving mode, it is preferable to record this matter in the recording section 32. Next, the driving control section 34 supplies the driving instruction to the three-dimensional-measurement-machine main body 2 (S732).

The three-dimensional-measurement-machine main body 2 starts driving of the driving mechanism 25, in response to reception of the driving instruction from the motion controller 3. At that time, in the motion controller 3, it is preferable that the TRC 31 specify and record the driving started time. In the state that the three-dimensional-measurement-machine main body 2 is being driven, the data generation section 38 in the motion controller 3 generates and records the probe driving information 327, if necessary (S733/this will be explained later in FIGS. 8(*a*)-8(*c*)). After the three-dimensional-measurement-machine main body 2 terminates driving of the driving mechanism 25 (S722), the data generation section 38 in the motion controller 3 generates and records the move mechanism driving information 325 (S734/this will be explained later in FIG. 9). The recorded probe driving information 327 and move mechanism driving information 325 is suppled to the host computer 5, and outputted, by the display section 55, as part of the operation state information 527 representing the state of driving (S752/FIG. 10). Note that at least a part of processing for generating the probe driving information 327 may be performed at arbitrary timing, in association with S731, S732, or S734, rather than S733.

Figure 8C:
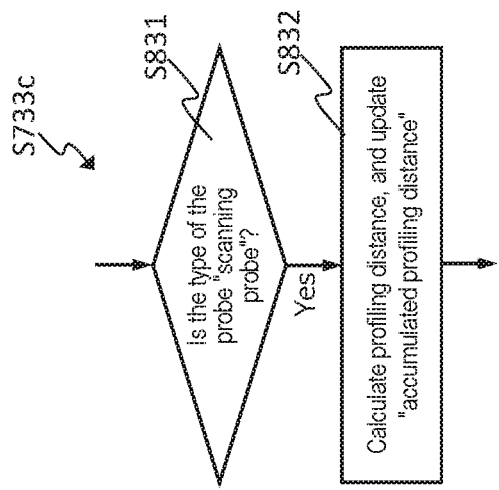
FIG. 8C is a flowchart of processing in the motion controller.
Figure 8B:
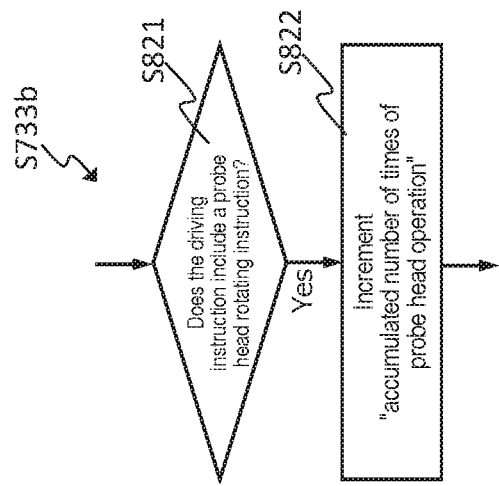
FIG. 8B is a flowchart of processing in the motion controller.
Figure 8A:
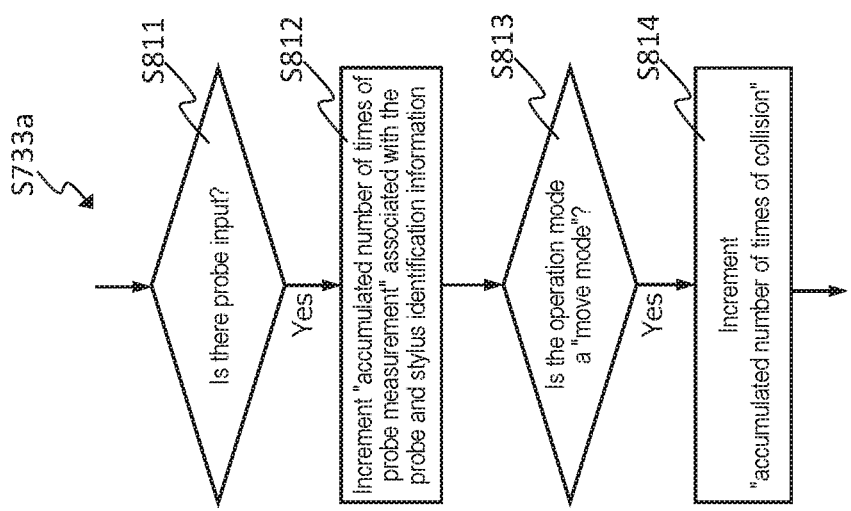
FIG. 8A is a flowchart of processing in a motion controller.
Figure 9:
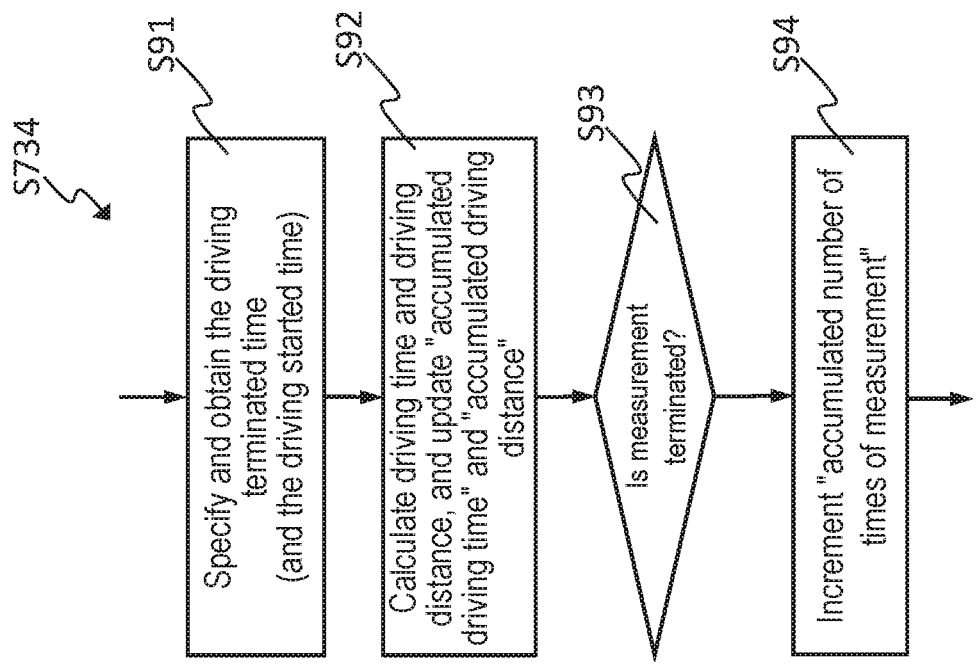
FIG. 9 is a flowchart of processing in the motion controller.

FIGS. 8(*a*)-8(*c*) show some examples relating to processing for generating the probe driving information 327 in S733. S733*a* in FIG. 8A shows examples of data items of the "accumulated number of times of probe measurement" and the "accumulated number of times of collision," S733*b* in FIG. 8B shows an example of a data item of the "accumulated number of times of probe head operation," and S733*c* in FIG. 8C shows an example of a data item of the "accumulated scanning distance." Note that, in addition to the above, the probe driving information 327 generated in S733 may include operation time of the three-dimensional-measurement-machine main body 2. Specifically, after the time of a start of driving of the three-dimensional-measurement-machine main body (S721) is specified by the RTC 31, and until termination of driving (S722), the time is specified, in a continuous manner, at timing of predetermined time intervals (for example, every 0.1 second) by the TRC 31, and the driving time is added (counted), in a repeating manner, by driving time calculation section 351.

According thereto, the probe driving information 327 relating to the probe can be effectively obtained, and a variety of driving information can be generated. The variety of driving information can be used for detailed analysis of a driving state. Especially, the probe driving information 327 is information which can be effectively used for grasping a state of use of the presently attached probe 21, that is, can be used for appropriate analysis relating to a degree of consumption of the probe and timing to change the probe.

In S733a of FIG. 8A, first, it judged by the probe input judgment section 373 whether there is probe input (S811). In the driving state of the three-dimensional-measurement-machine main body 2, the following processing is repeatedly performed every time when it is judged that there is probe input. Specifically, the data generation section 38 increments and records the accumulated number of times of probe measurement 327a associated with the identification number of times of the probe 21 obtained in S731 (S812). Similarly, the accumulated number of times of probe measurement 327a associated with the identification number of times of the stylus 211, which is obtained in S731, may be incremented and recorded (S812). The thus using recorded accumulated number of times of probe measurement 327a, the accumulated number of times of measurement of each of probes 21 and styluses 211 can be identified, and the accumulated number of times of probe measurement 327a is used in the host computer for analysis of the state of use of each of probes 21 and styluses 211, and the state of consumption of the probe modules and the state of consumption of styluses.

Continuously, the operation mode judgment section 372 judges whether the move mechanism 22 is being operated in the "move mode" (S813). This is judgment based on designation information with respect to the operation mode included in the driving instruction supplied in S751. If it is judged as a result of the judgment that the mode is the "move mode" (which is not the "measurement mode"), the data generation section 38 increments and records, with respect to the probe input judged in S811, the number of times of the input as the accumulated number of times of collision 327d (S814). In general, when the move mechanism 22 operates in the "move mode," the speed of movement of the probe 21 is often faster than that in the "measurement mode." In this regard, it is assumed that probe input during the "move mode" may become a cause of failure of the three-dimensional-measurement-machine main body 2. Thus, probe input during the "move mode" is regarded as collision, and counted and recorded as an accumulated number collision. The recorded accumulated number of times of collision 327d is used in the host computer 5 for analysis of the state of consumption of the three-dimensional-measurement-machine main body 2 due to collision on an object to be measured.

In S733b of FIG. 8B, in the case that instruction for rotating the probe head is included in the driving instruction (S821), the data generation section 38 increments and records the accumulated number of times of probe head operation 327b. The recorded accumulated number of times of probe head operation 327b represents the accumulated number of times of operation of the probe head, and is used in the host computer 5 for analysis of the state of consumption of the probe head 26 of the three-dimensional-measurement-machine main body 2.

In S733c of FIG. 8C, it judged by the probe type judgment section 371 whether the type of the probe attached to the move mechanism 22 is "scanning probe" (S831). In the case of the "scanning probe," a scanning distance in scanning measurement is calculated by the scanning distance calculation section (the probe movement calculation section 362). Thereafter, the scanning distance is added, by the data generation section 38, to the accumulated scanning distance 327c. That is, the accumulated scanning distance 327c is updated and recorded in the recording section 32 (S832). The recorded accumulated scanning distance 327c can be used for calculating the accumulated number of times of measurement with respect to each probe, and is used by the host computer 5 for analysis of the state of consumption of the scanning probe module, and the state of consumption of the stylus attached to the scanning probe.

FIG. 9 shows an example relating to processing for generating, by the data generation section 38, the move mechanism driving information 325 in S734. When the three-dimensional-measurement-machine main body 2 terminates driving in S722, and a signal relating thereto is received by the motion controller 3, the RTC 31 in the motion controller 3 specifies and records the driving terminated time (S91). (The driving started time has already been recorded in response to S721.) In response to an event that the driving terminated time is specified, the driving time calculation section 351 terminates addition (counting) of the driving time in S733. The driving time is added to the accumulated driving time 325a. That is, the accumulated driving time 325a is updated and recorded in the recording section 32 (S92). The recorded accumulated driving time 325a is used in the host computer 5 for analysis of the state of driving of the three-dimensional-measurement-machine main body 2. Specifically, by dividing the accumulated driving time 325a by the above-stated accumulated electric-conduction time 323a, the rate of operation of the three-dimensional-measurement-machine main body 2 can be calculated.

In addition to the accumulated driving time 325a, the accumulated driving distance 325b is calculated by the movement calculation section 36. That is, in the motion controller 3, the driving distance is calculated based on the amount of movement of the sliding mechanism calculated by the sliding mechanism movement calculation section 361. The driving distance is added, by the data generation section 38, to the accumulated driving distance 325b. That is, the accumulated driving distance 325b updated and recorded in the recording section 32 (S92). The recorded accumulated driving distance 325a is used by the host computer 5 for analysis of the state of driving of the three-dimensional-measurement-machine main body 2.

Next, it is judged whether measurement is ended (S93). Specifically, after specifying the driving terminated time in S91, the time timed by the RTC31 is monitored, and judgment as to whether predetermined waiting time has elapsed is made. That is, in the case that no new driving instruction is inputted to the motion controller 3 during the period from the time that the driving time is ended, which is specified in step S91, to the time that the waiting time is elapsed, it is judged that measurement of one time is completed. In this case, the data generation section 38 increments and records the accumulated number of times of measurement 325c (S94). The recorded accumulated number of times of measurement 325c is used by the host computer 5 for analysis of the state of driving of the three-dimensional-measurement-machine main body 2.

In the processing flow shown in FIG. 10, the driving information relating to the three-dimensional-measurement-machine main body 2, which is that received from the motion controller 3 and shown in S651 and S752, is used for analyzing the driving state and generating the operation state information 527. The operation state information 527 is displayed by the display section 55.

First, the data acquisition section 53 receives, from the motion controller 3, the driving information relating to the three-dimensional-measurement-machine main body 2 (S101). Specifically, it may be preferable to obtain the main body driving information 323, the move mechanism driving information 325, and the probe driving information 327, and store, as the acquired information 523, in the recording section 52. The main body driving information 323 includes the accumulated electric-conduction time 323a. Also, the move mechanism driving information 325 includes the accumulated driving time 325a, the accumulated driving distance 325b, and the accumulated number of times of measurement 325c. Similarly, the probe driving information 327 includes the accumulated number of times of probe measurement 327a, the accumulated number of times of probe head operation 327b, the accumulated scanning distance 327c, and the accumulated number of times of collision 327d.

Next, the data processing section 54 refers to the recording section 52, and extracts lifetime information 521c corresponding to each piece of the above driving information (S102). Specifically, respective data items of the main body driving lifetime information, move mechanism driving lifetime information, and probe driving lifetime information (none is shown in the figures), which correspond to respective data items in the above-stated main body driving information 323, move mechanism driving information 325, and probe driving information 327, are extracted. The main body driving lifetime information includes lifetime electric-conduction time. Also, the move mechanism driving lifetime information includes lifetime driving time, lifetime driving distance, and the lifetime number of times of measurement. Similarly, the probe driving lifetime information includes the lifetime number of times of probe measurement, the lifetime number of times of probe head operation, lifetime scanning distance, and the lifetime number of times of collision. The probe driving lifetime information is associated with an identification number of times of a probe, in a manner similar to that in the case of the probe driving information.

Next, the data processing section 54 generates and records the operation state information 527 relating to the three-dimensional-measurement-machine main body 2. The operation state information 527 is outputted to the display means 62 by the display section 55 (S103). The operation state information 527 includes an operation state graph, which visually presents the state of operation, and an alarm. That is, the graph presentation section 551 generates, with respect to each data item, a graph for comparing driving information and lifetime information, and displays it on the display means 62. In an example, it is preferable that the graph displayed by the graph presentation section 551 be a bar graph displaying, for each data item, driving information (the amount of driving) and lifetime information (the ensured amount) in a side-by-side manner (or an overlapping manner). Further, for each data item, it is preferable to judge, in the case that the amount of driving does not exceed the ensured amount, that the state of operation is normal, and color the graph (for example, in green) and display it. On the other hand, it is preferable to judge, in the case that the amount of driving exceeds the ensured amount, that the state is abnormal, and color the graph differently (for example, in red) and display it. Further, in the case that a specific data item is judged to be in an abnormal state, it is preferable that the alerting section 552 make an alarm message or code corresponding thereto to be displayed on the display means 62. It is preferable that the alarm message represents a message which urges change of a part relating the data item, a message which explains that the amount of use of a part is equal to or above a defined amount, and so on. Note that any mode of display of the graph, which shows the operation state, and the content of the alarm message is adoptable.

In this manner, a user can appropriately grasp various pieces of operation state information, such as those of the probes and so on, and it makes possible to perform effective preventive maintenance, according to calculation of precise maintenance time. It also makes possible to prompt, at appropriate timing, a user to perform maintenance, and facilitate processing such as that for investigating cause of an operational failure when it actually has occurred in the three-dimensional-measurement-machine main body 2.

Regarding the lifetime information 521c, note that the lifetime information correcting section 512 accepts manipulation for change, which is performed by a user via the input means 61. By recording the lifetime information 521c in the recording section 52 of the host computer 5, user can flexibly change it via the input means 61, compared with the case that it is recorded in the motion controller 3. In the case that the lifetime information 521c is recorded in the motion controller 3, it is required to change the program for controlling the motion controller 3, for changing the lifetime information 521c. On the other hand, in the case that it is recorded in the host computer 5, it becomes possible to easily change it by a user via a user interface displayed on screen of an application. The user may use default lifetime information initially set by a manufacturer, or may set lifetime information, in a flexible manner, according to the actual state of use. In the latter case, the user can independently change the lifetime information, thus, preventive maintenance can be performed earlier, and flexible action can be performed.

Examples of Modifications

The present invention is not limited to the above-stated embodiment, and includes examples of modifications which are explained below and are within the scope that the objects of the present invention can be achieved.

In the above-stated embodiment, the motion controller 3 is connected to the three-dimensional-measurement-machine main body 2; however, it may be incorporated within the three-dimensional-measurement-machine main body 2. Also, in the above-stated embodiment, the accumulated driving time 325a, the accumulated driving distance 325b, and the accumulated number of times of measurement 325c are illustrated as the move mechanism driving information 325 generated by the motion controller 3. However, in addition to the above, the value of current and the number of times of rotation of a driving motor included in each of X-axis, Y-axis, and Z-axis driving sections 251X-Z of the driving mechanism 25 may be generated and stored as additional items of the driving state information by the motion controller 3, for example.

Further, in the above-stated embodiment, the host computer 5 is illustrated as an output means. In addition, an example in which the operation state information 527 is displayed on the display means 62 of the host computer 5 is shown, especially. The operation state information 527 includes a graph showing an operation state. In addition to the above, such a graph may associate the operation state information with date and time information, and history is managed by the host computer 5, thus, the graph may be a time series graph which is based on the history.

In addition, as examples of the output means other than the host computer 5, a monitor which is directly connected to the motion controller 3, a small-size display constructed as a part of the motion controller 3, and so on may be adopted. Further, the output means may be a speaker which can perform presentation of information for a user by use of sound, a printer which can perform presentation of information for a user by performing printing on a piece of paper or the like, and so on.

Further, in the case that the motion controller 3 comprises a communication interface section and is connectable to a network such as the Internet or the like, it may be possible to output data to an external device such as a server device, or an external resource such as a cloud computing device. According thereto, it becomes possible to unitarily manage, by an external device or an external resource via a network, measurement data and/or operation state information with respect to each location where the three-dimensional-measurement-machine main body 2 is installed.

The above-stated embodiment and modifications thereof are mere examples explained for facilitating understanding of the present invention, and are not those to be used for interpreting the present invention in a limiting manner. A person skilled in the art would understand that the present invention can be modified and improved without departing from the gist thereof, and that the present invention includes equivalents thereof.

INDUSTRIAL APPLICABILITY

The present invention can be used in a measurement device which performs measurement processing with respect to an object to be measured.

REFERENCE SIGNS LIST

1—three-dimensional measurement machine (measurement device/measurement system), 2—three-dimensional-measurement-machine main body (main body), 21—probe, 211—stylus, 211A—gauge head, 213—probe main body, 22—move mechanism, 24—sliding mechanism, 25—driving mechanism, 26—probe head, 3—motion controller (control section/control computer), 31—RTC (clock), 32—recording section, 34—driving control section, 35—time calculation section, 36—movement calculation section, 37—judgment section, 38—data generation section, 39—data outputting section, 5—host computer, 51—input section, 52—recording section, 53—data acquisition section, 54—data processing section, 55—display section

What is claimed is:

1. A measurement device comprising:
   a main body which comprises a probe having a gauge head which can be moved, in a relative manner, relative to an object to be measured, and a move mechanism for moving the gauge head; and
   a control section which controls driving of the move mechanism, and comprises a generation section for generating driving information of the main body, in association with identification information of the probe, in response to driving of the move mechanism, and a recording section for recording the driving information.

2. The measurement device according to claim 1, wherein:
   the control section further comprises an input judgment section for judging probe input by the probe, based on contact of the gauge head to the object to be measured, and
   when it is judged that there is probe input, the generation section increments an accumulated number of times of probe measurement included in the driving information.

3. The measurement device according to claim 2, wherein:
   a stylus, which has the gauge head at its tip, in the probe is detachably attached to a probe main body, and
   the incremented accumulated number of times of probe measurement is additionally associated with identification information of a stylus attached to the probe main body.

4. The measurement device according to one of claim 1, wherein:
   the control section further comprises a probe head instruction section which supplies, to the probe head, a rotation instruction for rotating the probe head by a predetermined angle, and
   when the rotation instruction is supplied by the probe head instruction section, the generation section increments an accumulated number of times of probe head operation and records it in the recording section.

5. The measurement device according to one of claim 1, wherein:
   the control section further comprises
   a probe type judgment section for judging whether the probe is a type of a scanning probe for scanning measurement, and
   a scanning distance calculation section for calculating a scanning distance, based on each of coordinate positions of the gauge head at predetermined sampling time, in the case that the probe is a type of a scanning probe; wherein
   when the scanning distance is calculated, the generation section adds the scanning distance to an accumulated scanning distance and records it in the recording section.

6. The measurement device according to one of claim 1, wherein:
   the control section further comprises
   an input judgment section for judging probe input in the probe, based on contact of the gauge head to the object to be measured, and
   a mode judgment section for judging whether the probe is operated under a predetermined mode; wherein
   when it is judged that there is probe input and the mode is judged to be the predetermined mode, the generation section further increments an accumulated number of times of collision and records it in the recording section.

7. The measurement device according to one of claim 1, wherein:
   the control section further comprises
   an electric-conduction time calculation section for calculating electric-conduction time of the main body, from application to disconnection of an electric power source, based on the time specified by a clock; wherein
   when the electric-conduction time is calculated, the generation section further adds the electric-conduction time to accumulated electric-conduction time information and records it in the recording section.

8. A measurement system comprising:
- a main-body device which comprises a probe having a gauge head which can be moved, in a relative manner, relative to an object to be measured, and a move mechanism for moving the probe,
- a control computer which is connected to the main-body device and drives the move mechanism, and
- a host computer which is connected to the control computer and records lifetime information of the main-body device; wherein
- the control computer is constructed to generate driving information of the main-body device in response to driving of the move mechanism, and store the driving information,
- the host computer is constructed to generate, when it receives driving information from the control computer, operation state information of the main-body device based on the lifetime information and the driving information, and output the operation state information, and
- the lifetime information and the driving information is associated with identification information of the probe.

9. The measurement system according to claim 8, wherein:
- identification information of the probe is received from the host computer when the control computer drives the move mechanism, and the identification information is associated with the driving information.

\* \* \* \* \*